United States Patent
Dubiel et al.

(12)

(10) Patent No.: US 10,850,240 B2
(45) Date of Patent: Dec. 1, 2020

(54) FLUID INJECTION SYSTEM

(71) Applicant: Chapin Manufacturing, Inc., Batavia, NY (US)

(72) Inventors: David Dubiel, N. Chili, NY (US); Edward Horeth, Rochester, NY (US)

(73) Assignee: Chapin Manufacturing, Inc., Batavia, NY (US)

( * ) Notice: Subject to any disclaimer, the term of this patent is extended or adjusted under 35 U.S.C. 154(b) by 191 days.

(21) Appl. No.: 15/807,265

(22) Filed: Nov. 8, 2017

(65) Prior Publication Data
US 2019/0133030 A1    May 9, 2019

(51) Int. Cl.
| B01F 1/00 | (2006.01) |
| A01C 23/00 | (2006.01) |
| A01C 23/02 | (2006.01) |
| A01M 7/00 | (2006.01) |
| A01C 23/04 | (2006.01) |

(52) U.S. Cl.
CPC .......... *B01F 1/0033* (2013.01); *A01C 23/007* (2013.01); *A01C 23/008* (2013.01); *A01C 23/023* (2013.01); *A01C 23/042* (2013.01); *A01M 7/00* (2013.01); *A01M 7/0089* (2013.01); *B01F 2001/0088* (2013.01); *B01F 2001/0094* (2013.01); *B01F 2215/0055* (2013.01)

(58) Field of Classification Search
CPC ............ B01F 3/0033; B01F 2001/0094; B01F 2001/0088; B01F 2215/0055; A01M 7/0089; A01M 7/00; A01C 23/023; A01C 23/008; A01C 23/007; A01C 23/042
See application file for complete search history.

(56) References Cited

U.S. PATENT DOCUMENTS

| 1,796,407 | A | * | 3/1931 | Shuldener | ............... C02F 1/686 |
| | | | | | 137/205.5 |
| 1,987,847 | A | * | 1/1935 | Flood | ................... B01D 27/005 |
| | | | | | 210/167.32 |
| 3,060,956 | A | | 10/1962 | Menzie | |
| 3,194,444 | A | | 7/1965 | Hubert | |
| 4,061,572 | A | | 12/1977 | Cohen et al. | |
| 4,121,773 | A | * | 10/1978 | Headen | ................. B01F 5/0496 |
| | | | | | 239/317 |
| 4,846,214 | A | | 7/1989 | Strong | |
| 5,246,168 | A | | 9/1993 | Williams | |
| 5,484,106 | A | | 1/1996 | Gilmond | |

(Continued)

*Primary Examiner* — Jessica Cahill
*Assistant Examiner* — Patrick C Williams
(74) *Attorney, Agent, or Firm* — Woods Oviatt Gilman LLP; Katherine H. McGuire, Esq.

(57) ABSTRACT

A fluid injection system includes a container and fluid injection device. The fluid injection device includes a housing having a flow tube having an inlet end and an outlet end. A shroud is positioned between the inlet end and the outlet end and has a first end and a second end defining a ramped surface therebetween. The shroud redefines at least a portion of the fluid pathway as a constricted fluid pathway. A diverter port is between the inlet end and the shroud and diverts a portion of the inlet fluid into the container. An injection port is between the shroud and the outlet end and receives product from the container. The first end of the shroud includes a step defining a notch in fluid communication with the diverter port. The second end defines a recess in fluid communication with the injection port.

12 Claims, 8 Drawing Sheets

(56) References Cited

U.S. PATENT DOCUMENTS

| | | | | |
|---|---|---|---|---|
| 5,957,379 | A | * | 9/1999 | McMorrow ............ B05B 7/2445 239/10 |
| 6,604,546 | B1 | | 8/2003 | Gilmore |
| 6,659,128 | B2 | | 12/2003 | Gilmore |
| 7,690,392 | B1 | * | 4/2010 | Sarkiss ................. B01F 5/0413 137/205.5 |
| 8,210,451 | B1 | | 7/2012 | Gooch et al. |
| 8,297,535 | B1 | * | 10/2012 | Reid .................... B01F 1/0033 137/268 |
| 8,647,483 | B2 | * | 2/2014 | Andrews ............... C02F 1/4674 137/599.15 |
| 9,095,825 | B2 | | 8/2015 | Gilmore et al. |

\* cited by examiner

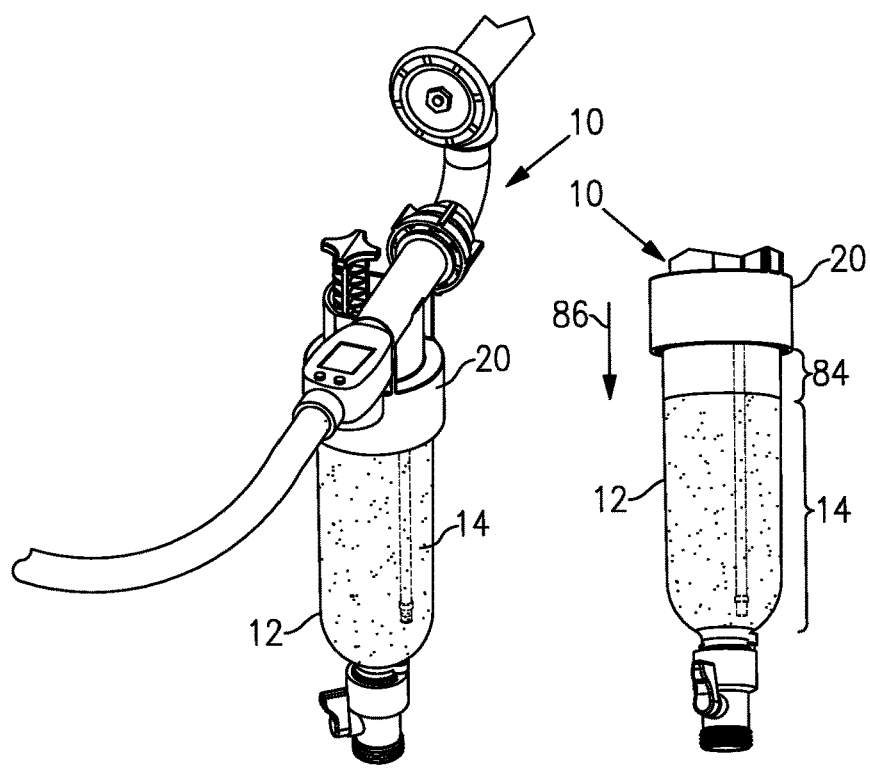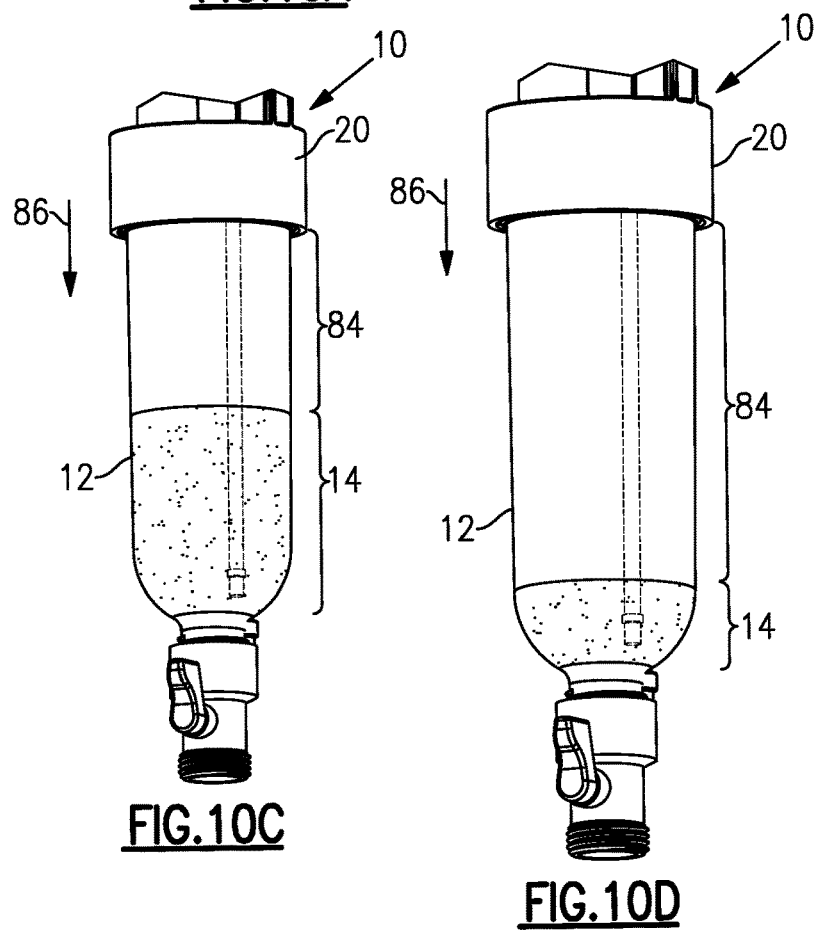
FIG.10A
FIG.10B
FIG.10C
FIG.10D

FLUID INJECTION SYSTEM

FIELD OF THE INVENTION

The present invention generally relates to fluid injection systems for dispensing a product from a container, and more particularly to a fluid injection system having a flow tube for drawing product from the container so as to dilute the product in a feed flow and dispense the diluted product therefrom, and still more particularly to a fluid injection system having a venturi tube including a shroud configured to promote product injection into the feed flow.

BACKGROUND OF THE INVENTION

Fluid injection systems, such as sprayers, suffer from a number of drawbacks. First, current systems fail to accurately inject product at the desired rate and concentration. For instance, some systems require continuous dilution of the product within the container prior to spraying. As such, the concentration of product being dispensed decreases over time. These and other systems are also unable to inject small, continuous quantities of product into the feeder fluid so as to produce a diluted product at low concentration. Instead, such systems periodically inject discrete aliquots of product into the fluid stream. Alternative systems divert a portion of the feeder fluid from the fluid path and use this portion to push product out of the container and into the fluid stream. However, such systems require multiple components making adjusting the feed rate and resultant dilution difficult and time consuming.

Thus, there remains a need for an irrigation injector system having a venturi tube configured to dispense a diluted product at a fixed metering rate. The present invention satisfies these, as well as other, needs.

SUMMARY OF THE INVENTION

In view of the above and in accordance with an aspect of the present invention, the present invention is generally directed to a fluid injection device configured for use with a container defining a cavity for receiving a product to be dispersed therefrom. The fluid injection device may comprise a housing adapted to mount onto the container, wherein the housing includes a flow tube defining a fluid pathway. The flow tube may have an inlet end configured to receive a feeder fluid and an outlet end configured to discharge a mixed fluid comprising the product and feeder fluid. A shroud may be positioned an intermediate distance between the inlet end and the outlet end and have a first end and a second end defining a ramped surface therebetween. The shroud may redefine at least a portion of the fluid pathway as a constricted fluid pathway. A diverter port may be located between the inlet end and the shroud. The diverter port may be configured to divert a portion of the feeder fluid from the inlet end into the container. An injection port may be located between the shroud and the outlet end and may be configured to receive the product from the container. The first end of the shroud may include a step defining a notch between the first end of the shroud and an inner wall of the flow tube. The notch is in fluid communication with the diverter port. The second end of the shroud may define a recess wherein the recess is in fluid communication with the injection port.

In a further aspect of the present invention, the flow tube may further include a weir adjacent to the shroud. The weir may further redefine at least a portion of the constricted fluid pathway as a further constricted fluid pathway. The housing may also further include a fill port configured to communicate with the cavity of the container and provide passage therethrough for refill product. A fill plug may be configured to threadably engage the fill port to form a fluid-tight seal. The housing may further include a collar configured to couple with an open mouth of the container. The collar may include threads configured to threadably engage mating threads defined on the mouth of the container.

In accordance with another aspect of the present invention, the present invention may be directed to a fluid injection system comprising a container configured to hold a product to be dispersed and a fluid injection device removably coupled to the container. The fluid injection device may comprise a housing adapted to mount onto the container, wherein the housing includes a flow tube defining a fluid pathway. The flow tube may have an inlet end configured to receive a feeder fluid and an outlet end configured to discharge a mixed fluid comprising the product and feeder fluid. A shroud may be positioned an intermediate distance between the inlet end and the outlet end and have a first end and a second end defining a ramped surface therebetween. The shroud may redefine at least a portion of the fluid pathway as a constricted fluid pathway. A diverter port may be located between the inlet end and the shroud. The diverter port may be configured to divert a portion of the feeder fluid from the inlet end into the container. An injection port may be located between the shroud and the outlet end and may be configured to receive the product from the container. The first end of the shroud may include a step defining a notch between the first end of the shroud and an inner wall of the flow tube. The notch is in fluid communication with the diverter port. The second end of the shroud may define a recess wherein the recess is in fluid communication with the injection port.

In accordance with a further aspect of the present invention, the flow tube may further include a weir adjacent to the shroud. The weir may further redefine at least a portion of the constricted fluid pathway as a further constricted fluid pathway. The housing may also further include a fill port configured to communicate with the cavity of the container and provide passage therethrough for refill product. A fill plug may be configured to threadably engage the fill port to form a fluid-tight seal. The housing may further include a collar configured to couple with an open mouth of the container. The collar may include threads configured to threadably engage mating threads defined on the mouth of the container.

In a further aspect of the present invention, the container may further include a drain port including a drain in fluid communication with the cavity of the container. The container may further include a valve coupled to the drain port wherein the valve is selectively movable from a first position wherein the drain is closed to a second position wherein the drain is open. The valve may be a ball valve or a stopcock valve. An injection tube may have a first end coupled to the injection port and a second end proximate the drain port. A filter may be coupled to the second end of the injection tube.

In still another aspect of the present invention, the container may be constructed of a transparent or translucent polymer material, such as high-density polyethylene, polycarbonate, polyethylene terephthalate, poly(methyl methacrylate), polypropylene, polyvinyl chloride and copolymers thereof.

Additional objects, advantages and novel aspects of the present invention will be set forth in part in the description which follows, and will in part become apparent to those in the practice of the invention, when considered with the attached figures.

BRIEF DESCRIPTION OF THE DRAWINGS

FIGS. 10A-10D are exemplary sequential photographs of a fluid injection system in accordance with the present invention in use; with FIG. 10A showing a container full of product, FIG. 10B showing the container partially filled with a feeder fluid with the remainder being product, FIG. 10C showing the container approximately half filled with feeder fluid and product, and FIG. 10D showing the container mostly filled with water with the remainder being product.

DETAILED DESCRIPTION OF THE PREFERRED EMBODIMENTS

Figure 1:
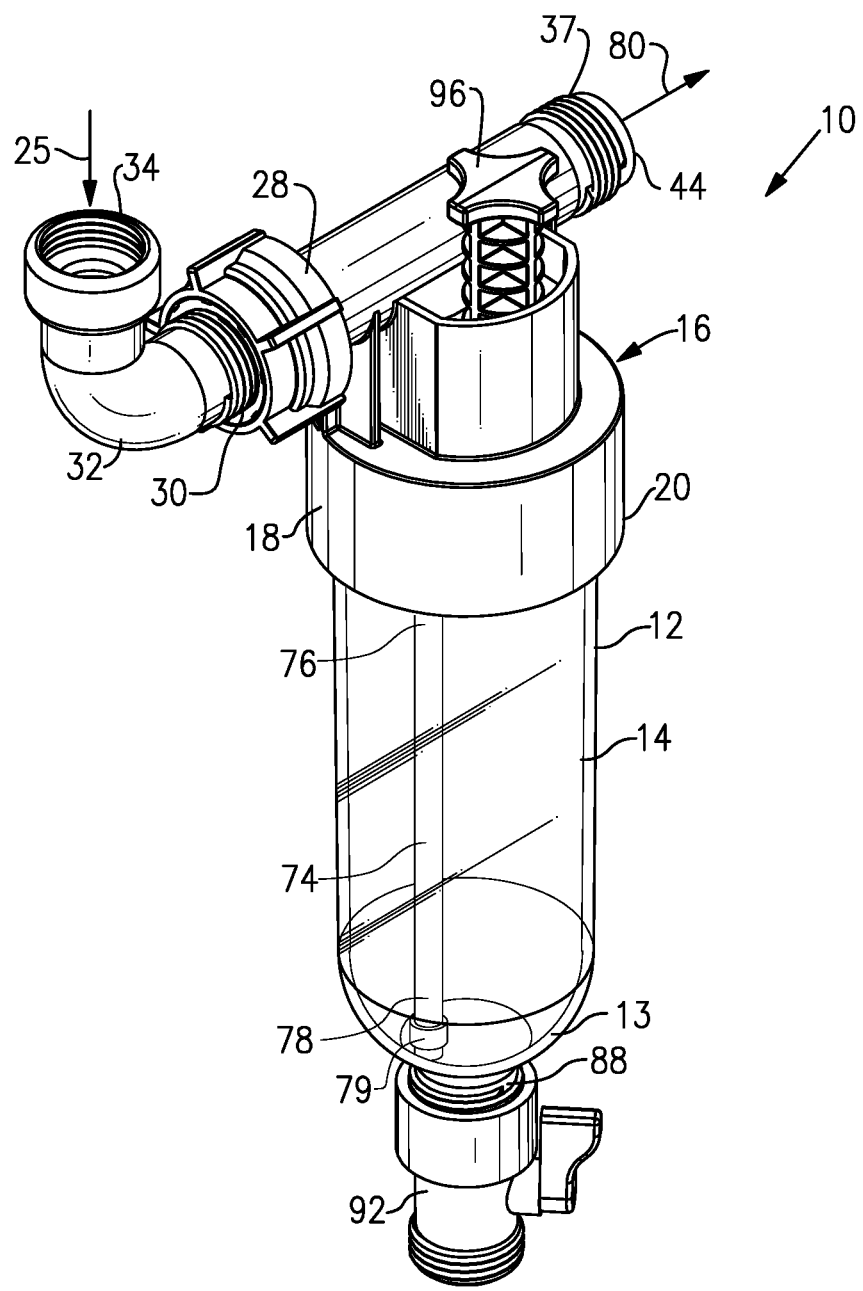
FIG. 1 is a perspective view of an embodiment of a fluid injection system in accordance with the present invention.
Figures 2, 3:
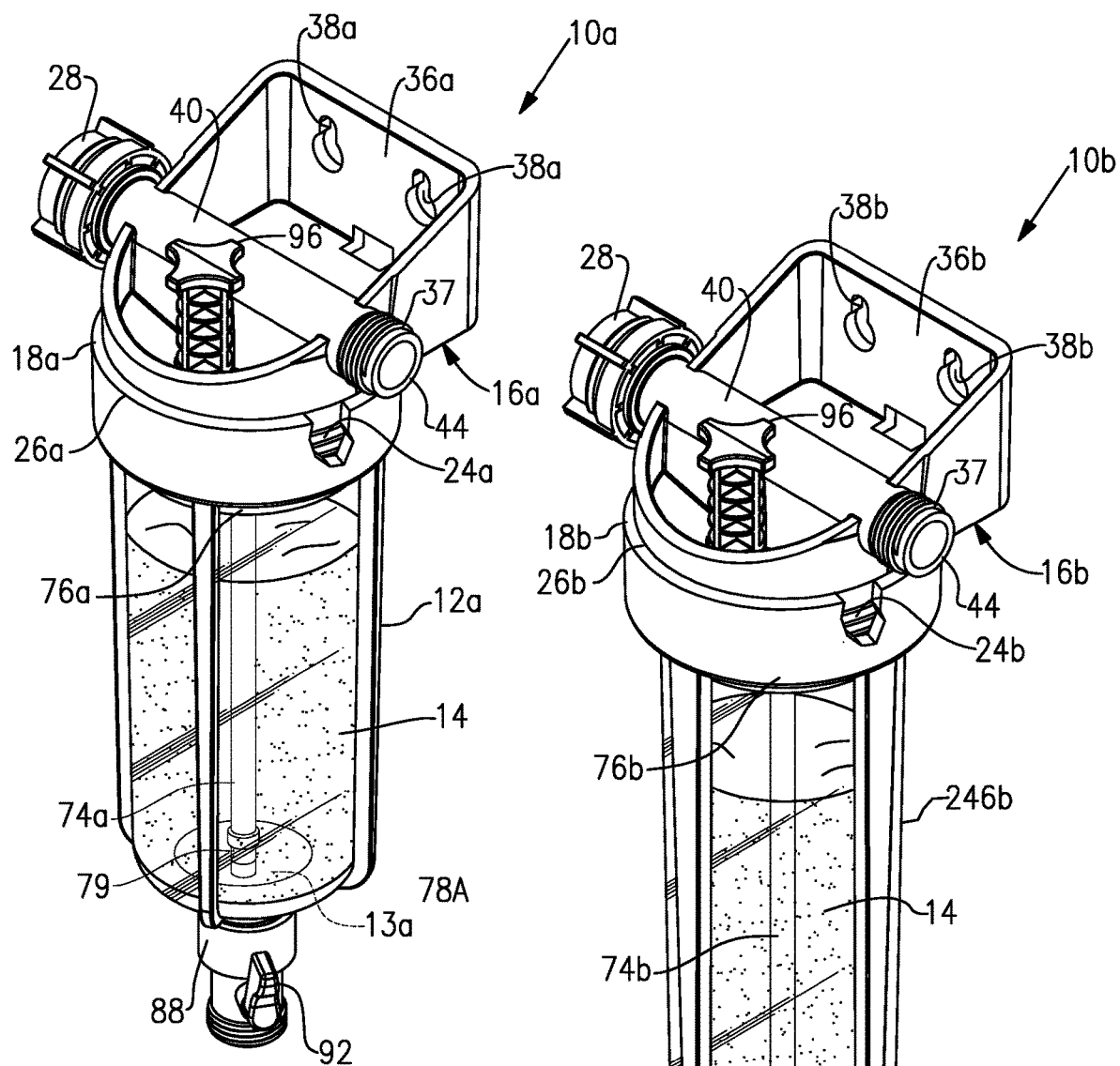
FIG. 2 is a perspective view of an alternative embodiment of a fluid injection system in accordance with the present invention.
FIG. 3 is a perspective view of another alternative embodiment of a fluid injection system in accordance with the present invention.

Referring now to FIGS. 1-3, there are shown respective exemplary fluid injection systems 10, 10a, 10b in accordance with an aspect of the present invention. Each fluid injection system 10, 10a, 10b may generally include a respective container 12, 12a, 12b configured to hold a product 14 therein. Containers 12, 12a, 12b may possess different capacities whereby a user may select a fluid injection system 10, 10a or 10b most suitable to its intended use. Product 14 may be a dry soluble product or may be a product solution. Non-limiting examples of suitable products may include pesticides, herbicides or fertilizers. Coupled to each respective container 12, 12a, 12b is a respective fluid injection device 16, 16a, 16b. Each fluid injection device 16, 16a, 16b generally includes a respective housing 18, 18a, 18b.

Figure 4:
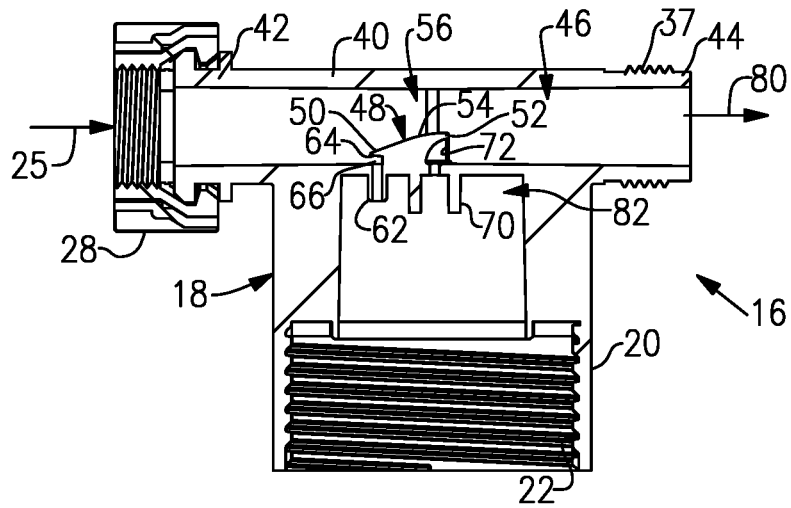
FIG. 4 is a longitudinal side cross section view of a housing configured for use with the fluid injection system shown in FIG. 1.
Figure 5:
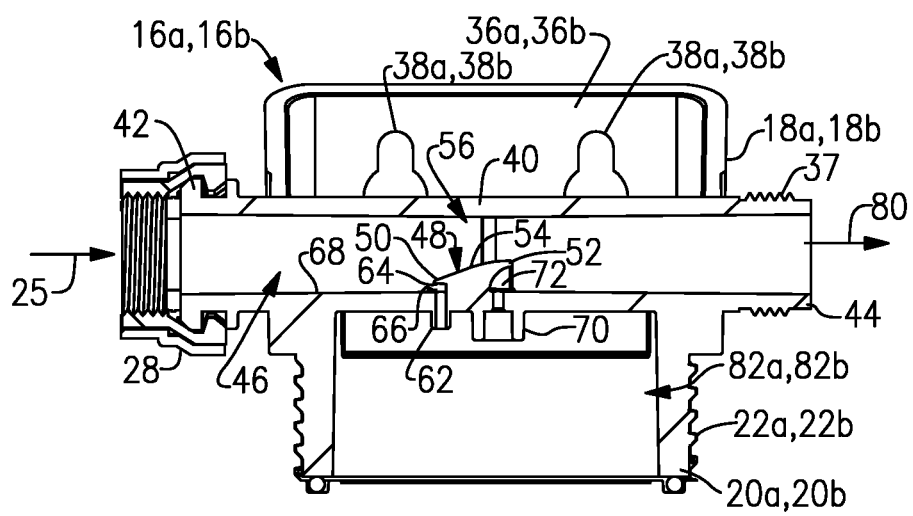
FIG. 5 is a longitudinal side cross section view of a housing configured for use with the fluid injection systems shown in FIGS. 2 and 3.
Figure 6:
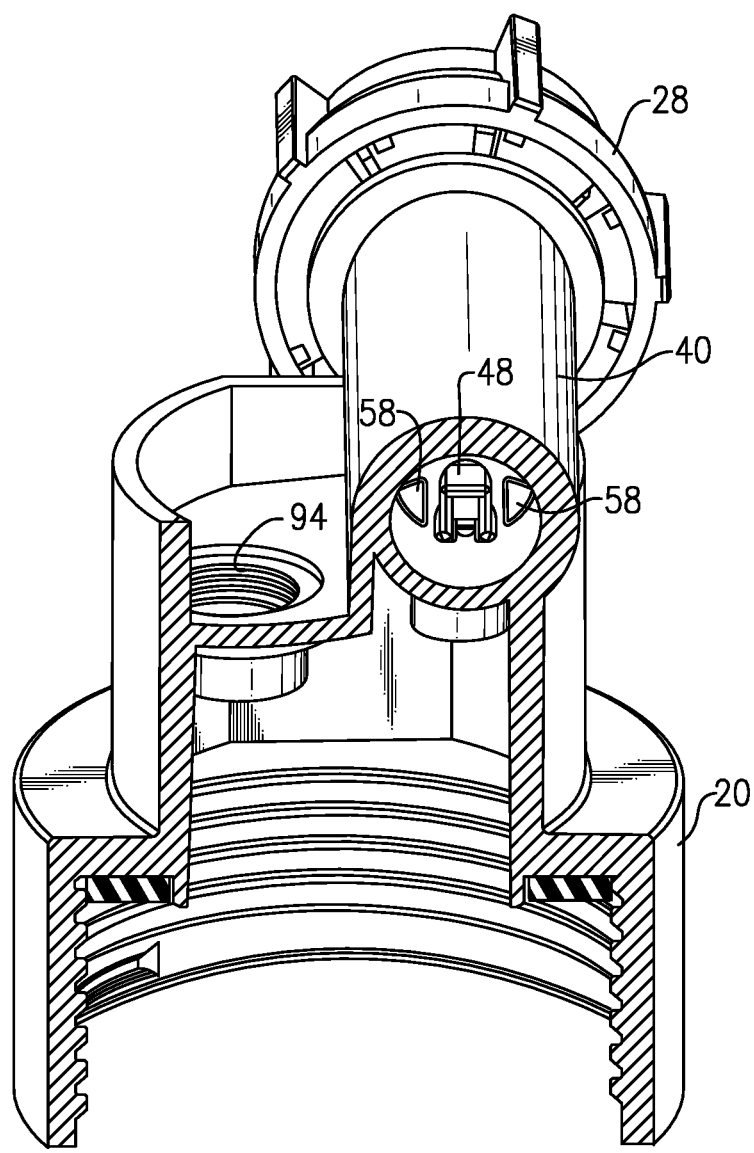
FIG. 6 is a transverse cross section view of a housing configured for use with the fluid injection system shown in FIG. 1.
Figure 7:
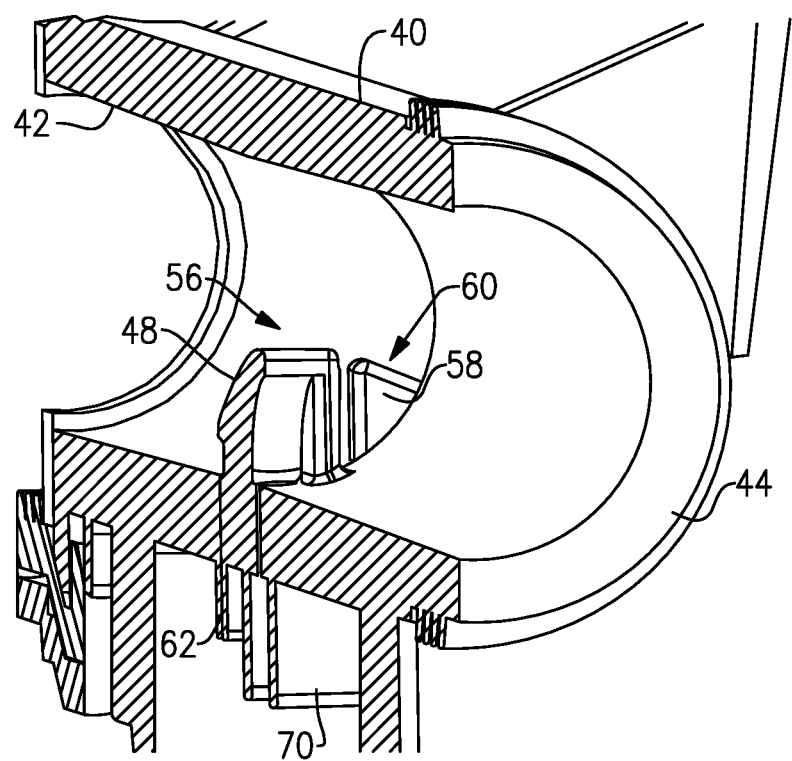
FIG. 7 is a perspective cross section view of the flow tube configured for use with the fluid injection systems shown in FIGS. 1-3.
Figure 8:
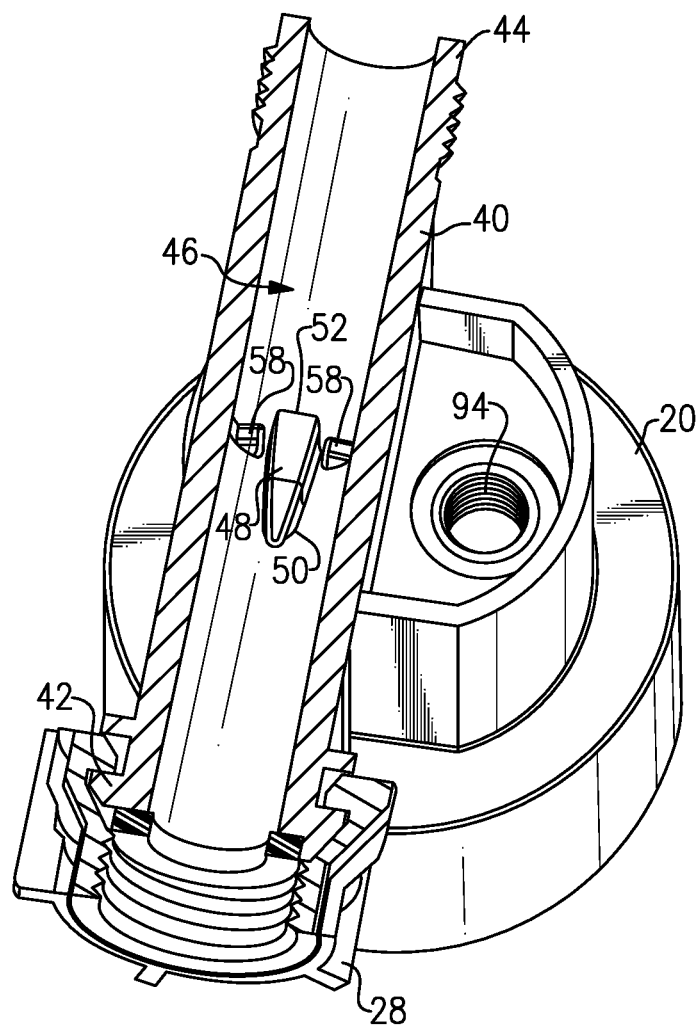
FIG. 8 is a longitudinal top perspective cross section view of a housing configured for use with the fluid injection system shown in FIG. 1.

By way of example, fluid injection system 10 may be a small capacity system (e.g., container 12 may have a 16 ounce capacity) such that housing 18 includes a collar 20 defining female threads 22 (see e.g., FIG. 4) which are configured to threadably engage mating male threads defined upon the mouth (not shown) of container 12. For larger capacity systems, such as system 10a which may have a 24 ounce capacity, or system 10b which may have a 32 ounce capacity, housing 18a, 18b may include a respective collar 20a, 20b defining male threads 22a, 22b (see e.g., FIG. 5) which are configured to threadably engage mating female threads 24a, 24b defined upon a respective mouth 26a, 26b of container 12a, 12b (see FIGS. 2 and 3).

Small capacity systems, such as fluid injection system 10, may be sufficiently light enough when container 12 is filled with fluid to be suspended directly from a hose bibb, such as a hose bibb mounted onto a building. To that end, housing 18 may include a coupling 28 configured to receive a first end 30 of mounting tube 32. Mounting tube 32 may then be directly coupled to the hose bibb (not shown) at second end 34. Larger capacity systems, such as fluid injection system 10a, 10b, however, may be too heavy to suspend directly from a hose bibb when container 12a, 12b is filled with fluid. To that end, each respective housing 18a, 18b may include a mounting flange 36a, 36b configured to releasably secure housing 18a, 18b (and thus fluid injection system 10a, 10b) to a post or other structure (not shown), such as via screws (not shown) passing through mounting holes 38a, 38b. Housing 18a, 18b may also include a coupling 28 configured to receive a hose (not shown), with the hose then being coupled to the hose bibb or another fluid supply. In this manner, the entire weight of fluid injection system 10a, 10b is not supported only by the hose bibb or mounting tube 32. In either event, a feeder fluid 25, such as water, may flow into fluid injection system 10, 10a, 10b during use as will be discussed in greater detail below.

With reference to FIGS. 1-5, each housing 18, 18a, 18b may include a flow tube 40 having an opposing inlet end 42 and outlet end 44 defining a fluid pathway 46 therebetween. As described above, each inlet end 42 may include a coupling 28 configured to couple housing 18, 18a, 18b with a hose bibb or other fluid supply. Outlet end 44 may define threads 37 whereby fluid injection system 10, 10a, 10b may be coupled to a desired downstream system component, such as without limitation, a delivery hose (not shown).

As shown most clearly in FIGS. 4-9, flow tube 40 may include a shroud 48 positioned an intermediate distance between inlet end 42 and outlet end 44, and in accordance with an aspect of the present invention, approximately equidistant between inlet end 42 and outlet end 44. Shroud 48 may include a first end 50 and a second end 52 defining a ramped surface 54 therebetween. In this manner, shroud 48 may redefine at least a portion of the fluid pathway 46 as constricted fluid pathway 56 as will be discussed in greater detail below. To further restrict constricted fluid pathway 56, flow tube 40 may further include one or more weirs 58 adjacent to shroud 48 so as to define a further constricted fluid pathway 60.

With continued reference to FIGS. 4-9, flow tube 40 may also include a diverter port 62 located between inlet end 42 and shroud 48. Diverter port 62 is configured to divert a portion of feeder fluid 25 received from inlet end 42 into container 12, 12a, 12b. To that end, first end 50 of shroud 48 may include a step 64 defining a notch 66 between first end 50 and inner wall 68 of flow tube 40. Notch 66 is in fluid communication with diverter port 62 such that a portion of feeder fluid 25 may be directed into container 12, 12a, 12b. Flow tube 40 may also include an injection port 70 between shroud 48 and outlet end 44. To that end, second end 52 of shroud 48 may define a recess 72 wherein recess 72 is in fluid communication with injection port 70. Injection port 70 may then be configured to receive product 14 from the container as will be described in greater detail below.

As is known in the art, as feeder fluid 25 passes through constricted fluid pathway 56 (and/or further constricted fluid pathway 60), its velocity increases resulting in a decrease in pressure which manifests as a partial vacuum proximate second end 52 of shroud 48 and the area of flow tube 40 immediately downstream thereof. This partial pressure operates to draw fluid from container 12, 12a, 12b through injection port 70 into flow tube 40. To that end, an injection tube 74, 74a, 74b may be coupled to injection port 70 at a first end 76, 76a, 76b while a second end 78, 78a, 78b is disposed within product 14 (see e.g., FIGS. 1-3). In accordance with an aspect of the present invention, second end 78, 78a, 78b terminates at or near bottom wall 13, 13a, 13b of container 12, 12a, 12b so as to inject nearly all of product 14 and limiting its waste. In this manner, as feeder fluid 25 flows through constricted fluid pathway 56 (and/or further constricted fluid pathway 60) and thereby creates the partial vacuum at and immediately following second end 52 of shroud 48, product 14 may be drawn from container 12, 12a, 12b through injection tube 74, 74a, 74b into flow tube 40. Product 14 may then mix with feeder fluid 25 within flow tube 40 so as to produce a mixed fluid 80 that is discharged through outlet end 44. Second end 78, 78a, 78b of injection tube 74, 74a, 74b may be coupled to a filter 79 so as to minimize or prevent introduction of particulate matter into flow tube 40.

Figure 9:
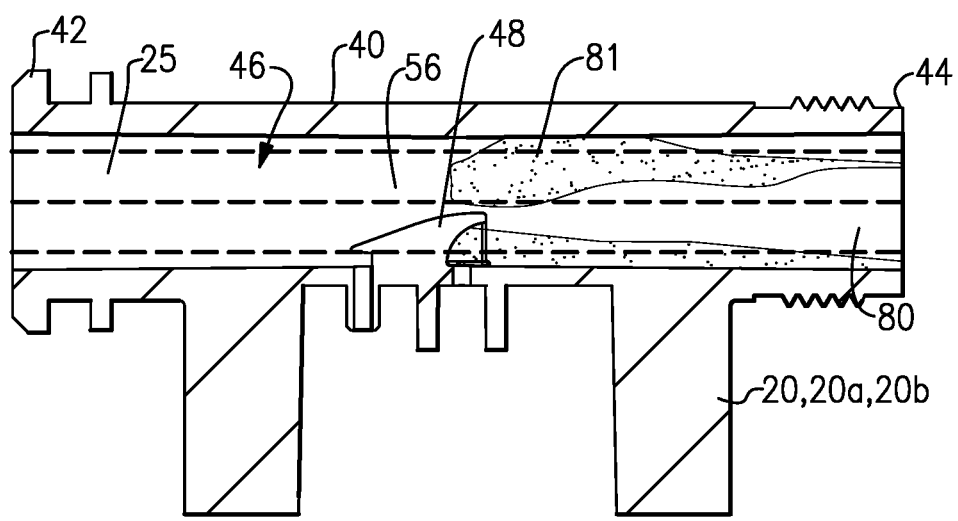
FIG. 9 is a longitudinal cross section view of the flow tube configured for use with the fluid injection systems shown in FIGS. 1-3 showing the flow velocity of fluid within the flow tube.

An exemplary computer model of this phenomenon using an embodiment of flow tube 40 with shroud 48 and weirs 58 in accordance with an aspect of the present invention is shown in FIG. 9. As can be seen in FIG. 9, a relatively slow flowing feeder fluid 25 moves left to right from inlet end 42 to outlet end 44. Upon flowing past constricted fluid pathway 56 (and/or further constricted fluid pathway 60), the flow velocity of feeder fluid 25 increases as generally indicated by the dark gray gradient 81. Product 14 is then drawn through injection port 70 at low velocity due to the partial vacuum created via the venturi effect generated by constricted fluid pathway 56 (and/or further constricted fluid pathway 60). Product 14 may then mix with feeder fluid 25 before mixed fluid 80 exits outlet end 44 at or about the initial velocity of feeder fluid 25 entering via inlet end 42.

Upon drawing of product 14 through injection tube 74, 74a, 74b as described above, the interior headspace 82, 82a, 82b of container 12, 12a, 12b/housing 18, 18a, 18b (see FIGS. 4 and 5) will experience a negative internal pressure/partial vacuum which may aid diversion of a portion of feeder fluid 25 through diverter port 62 into container 12, 12a, 12b as described above. As shown in FIG. 10A-10D, the portion of feeder fluid 25 is deposited within the container (such as, for example, container 12) where it may, in accordance with an aspect of the present invention, form a liquid layer 84 (generally indicated by the light color) layered atop product 14 (generally indicated by the dark color). Liquid layer 84 may operate to apply a downward force (shown generally as arrow 86) upon product 14 without significantly diluting product 14 (some minimal dilution may occur at the boundary between liquid layer 84 and product 14, but bulk dilution may be avoided). The rate of deposition of feeder fluid 25 (and development of liquid layer 84), as well as the rate of withdrawal of product 14 via injection port 70, is determined by the flow rate of feeder fluid 25 entering inlet end 42 and the size of constricted fluid pathway 56 (and/or further constricted fluid pathway 60). Diverter port 62 and injection port 70 may operate to equalize pressure in container 12, 12a, 12b such that fluid injection device 16, 16a, 16b may be generally referred to as a push-pull injector.

As can be seen in the sequence shown in FIGS. 10A-10D, product 14 is continually injected into flow tube 40 as a portion of feeder fluid 25 is diverted into container 12, 12a, 12b. Thus, at some point container 12, 12a, 12b will need to be emptied of feeder fluid 25 and replenished with replacement product 14. To facilitate replenishment of product 14, container 12, 12a, 12b may include a drain port 88 including a drain in fluid communication with the interior cavity of container 12, 12a, 12b (see FIGS. 1-3). A valve 92 may be coupled to drain port 88 and be selectively movable from a first position wherein the drain is closed to a second position wherein the drain is open and feeder fluid 25 may flow out of container 12, 12a, 12b. By way of example and without limitation thereto, valve 92 may be a ball valve or a stopcock valve. Once feeder fluid 25 has been drained from container 12, 12a, 12b, valve 92 is placed in the first position. Housing 18, 18a, 18b may define a fill port 94 (see e.g., FIGS. 6 and 8) through which replacement product may pass into container without requiring removal of container 12, 12a, 12b from housing 18, 18a, 18b or housing 18, 18a, 18b from the coupled hose bibb. A fill plug 96 (see e.g., FIGS. 1-3) may seal fill port 94 when fluid injection device 16, 16a, 16b is in use so as to enable development of the negative internal pressure/partial vacuum within container 12, 12a, 12b as described above.

In accordance with an aspect of the present invention, container 12, 12a, 12b may be constructed of a transparent or translucent polymer material. Non-limiting examples include high-density polyethylene, polycarbonate, polyethylene terephthalate, poly(methyl methacrylate), polypropylene, polyvinyl chloride and copolymers thereof. Thus, provided that there is a discernible difference between feeder fluid 25 and product 14, a user may visually inspect container 12, 12a, 12b to determine if product 14 has been dispensed and in need of replenishment as described above.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A fluid injection system comprising:
   a. a container configured to hold a product to be dispersed;
   b. a fluid injection device removably coupled to the container, the fluid injection device comprising:
      i) a housing adapted to mount onto the container, wherein the housing includes a flow tube defining a fluid pathway, the flow tube having:
         a) an inlet end configured to receive a feeder fluid;
         b) an outlet end configured to discharge a mixed fluid comprising the product and feeder fluid;
         c) a shroud positioned an intermediate distance between the inlet end and the outlet end, wherein the shroud has a first end including a step having a bottom surface a parallel spaced distance above an inner wall of the flow tube so as to define a notch between the step and the inner wall, and a second end defining a recess between the second end and the inner wall, wherein the shroud creates a ramped surface with the notch being smaller than the recess and the shroud redefining at least a portion of the fluid pathway as a constricted fluid pathway;

d) a diverter port between the inlet end and the shroud and in communication with the notch, wherein the diverter port is configured to divert a portion of the feeder fluid from the inlet end into the container; and e) an injection port between the shroud and the outlet end and in communication with the recess, wherein the injection port is configured to receive the product from the container; and ii) an injection tube having a first end coupled to the injection port and an opposing second end extending into a cavity of the container and terminating an intermediate distance above a bottom wall of the container.

2. The fluid injection system of claim 1 wherein the flow tube further includes a weir adjacent to the shroud, wherein the weir further redefines at least a portion of the constricted fluid pathway as a further constricted fluid pathway.

3. The fluid injection system of claim 1 wherein the housing further includes a fill port configured to communicate with the cavity of the container and provide passage therethrough for refill product.

4. The fluid injection device of claim 3 wherein the housing further includes a fill plug configured to threadably engage the fill port to form a fluid-tight seal.

5. The fluid injection system of claim 1 wherein the housing further includes a collar configured to couple with an open mouth of the container.

6. The fluid injection system of claim 5 wherein the collar includes threads configured to threadably engage mating threads defined on the mouth of the container.

7. The fluid injection system of claim 1 wherein the container further includes a drain port including a drain in fluid communication with the cavity of the container.

8. The fluid injection system of claim 7 wherein the container further includes a valve coupled to the drain port, wherein the valve is selectively movable from a first position wherein the drain is closed to a second position wherein the drain is open.

9. The fluid injection system of claim 8 wherein the valve is a ball valve or a stopcock valve.

10. The fluid injection system of claim 1 wherein the injection tube is a close-walled tube and wherein the second end of the injection tube defines an open orifice configured to receive the product therethrough, and wherein the injection tube further comprises a filter coupled to the second end of the injection tube with the filter located an intermediate distance above the bottom wall of the container.

11. The fluid injection system of claim 1 wherein the container is constructed of a transparent or translucent polymer material.

12. The fluid injection system of claim 11 wherein the polymer material is selected from the list consisting of high-density polyethylene, polycarbonate, polyethylene terephthalate, poly(methyl methacrylate), polypropylene, polyvinyl chloride and copolymers thereof.

* * * * *